Oct. 7, 1969   P. HINI   3,471,722
NONCONTACT ELECTRICAL COUPLING SEMICONDUCTOR DEVICE
Filed May 31, 1966   2 Sheets-Sheet 1

United States Patent Office 3,471,722
Patented Oct. 7, 1969

3,471,722
NONCONTACT ELECTRICAL COUPLING SEMICONDUCTOR DEVICE
Paul Hini, Erlangen, Germany, assignor to Siemens Aktiengesellschaft, Erlangen, Germany, a corporation of Germany
Filed May 31, 1966, Ser. No. 553,800
Claims priority, application Germany, May 31, 1965, S 97,377
Int. Cl. H02k 13/10
U.S. Cl. 310—10       10 Claims

ABSTRACT OF THE DISCLOSURE

A contact-free electrical coupling device comprises a magnetic circuit. A plurality of spaced switch members of disc-like configuration are coaxially affixed on a rotatable part of the magnetic circuit and rotate therewith about the axis thereof. Each of the switch members has a circular sector cutout therefrom in a manner whereby magnetic flux of the magnetic circuit is maintained in any rotary position of the switch member. The cutouts are angularly positioned in a determined relation to each other in a manner whereby the entire magnetic flux of the magnetic circuit is concentrated by one of the switch members. A plurality of spaced galvanomagnetic semiconductor field plates are each positioned in radial alignment with a corresponding one of the switch members.

DESCRIPTION OF THE INVENTION

The present invention relates to a noncontact electrical coupling semiconductor device. More particularly, the invention relates to a galvanomagnetic semiconducting device which functions as a noncontact electrical coupling.

A galvanomagnetic semiconductor resistor, particularly of indium antimonide or indium arsenide comprising a field plate, may be positioned in the air gap between the pole shoes of magnets. This provides a noncontact or contact-free variable resistor or potentiometer for an electrical coupling or signalling device. The electrical resistance is varied by variation, for example, of the magnetic field relative to the field plate. The electrical resistance of the field plate reaches a maximum magnitude $R_B$ when the field plate is positioned completely within the magnetic field or when the magnetic field is at its highest intensity. The electrical resistance of the field plate is reduced to a minimum magnitude $R_0$ when the field plate is completely removed from the magnetic field or when the magnetic field is at its lowest intensity. A field plate may be utilized, for example, in controlling a transistor. For this purpose, the field plate may be positioned between the base and emitter or between the base and collector of the transistor. Such a device may be utilized as a commutator for a DC machine.

In a DC machine, the rotary speed of the rotary field depends upon the instantaneous speed of the rotor. This permits satisfactory control of the DC machine so that it has a wide range of applicability, despite the commutator losses, commutator wear and curent supply to the rotor. The limited lamination voltage of the commutator, the wear of the mechanical contacts of the commutator and the losses of the commutator are disadvantages which may be eliminated by a noncontact or contact-free commutator.

Noncontact commutators have not been utilized in practice to any great extent because they have not operated effectively. The effectiveness of operation of a noncontact commutator is considerably dependent upon whether the resistance ratio $R_B/R_0$ may be made large enough. Known noncontact commutators provide switching pulses which are considerably lower in magnitude compared to those provided by mechanical commutators.

The principal object of the present invention is to provide a new and improved noncontact electrical coupling device. The electrical coupling device of the present invention provides electrical switching pulses which are high in magnitude and are substantially devoid of harmonic vibration, sparks or radio interference. The electrical coupling device of the present invention is especially adapted for use as a commutator for a DC machine. When the coupling device of the present invention is utilized as a commutator, field plates utilized therein control transistors which are connected to the excitation windings of the DC machine.

In accordance with the present invention, a contact-free electrical coupling device comprises a magnetic circuit having stationary parts and a rotatable part positioned between and spaced from the stationary parts and forming an air gap around the rotatable part. The rotatable part has an axis. A plurality of spaced switch members of substantially disc-like configuration coaxially affixed on the rotatable part rotates with the rotatable part about the axis. Each of the switch members has a circular sector cutout formed therein. The circular sector cutouts of the switch members are angularly positioned in a determined relation to each other. A plurality of spaced galvanomagnetic semiconductor field plates each positioned in radial alignment with a corresponding one of the switch members are mounted on one of the stationary parts in spaced relation with the switch members.

The galvanomagnetic semiconductor field plates may form an integral unit of determined structure mounted on a support plate. The integral unit may be of substantially E-shaped configuration having a stem portion and a plurality of branch portions each comprising a galvanomagnetic semiconductor field plate extending transversely from the stem portion to an end spaced from the stem portion. An electrical contact may then be connected to the stem portion on one side of the branch portions and an electrical contact may be connected to the end of each of the branch portions.

In order that the present invention may be readily carried into effect, it will now be described with reference to the accompanying drawings, wherein.

Figures 1, 2:
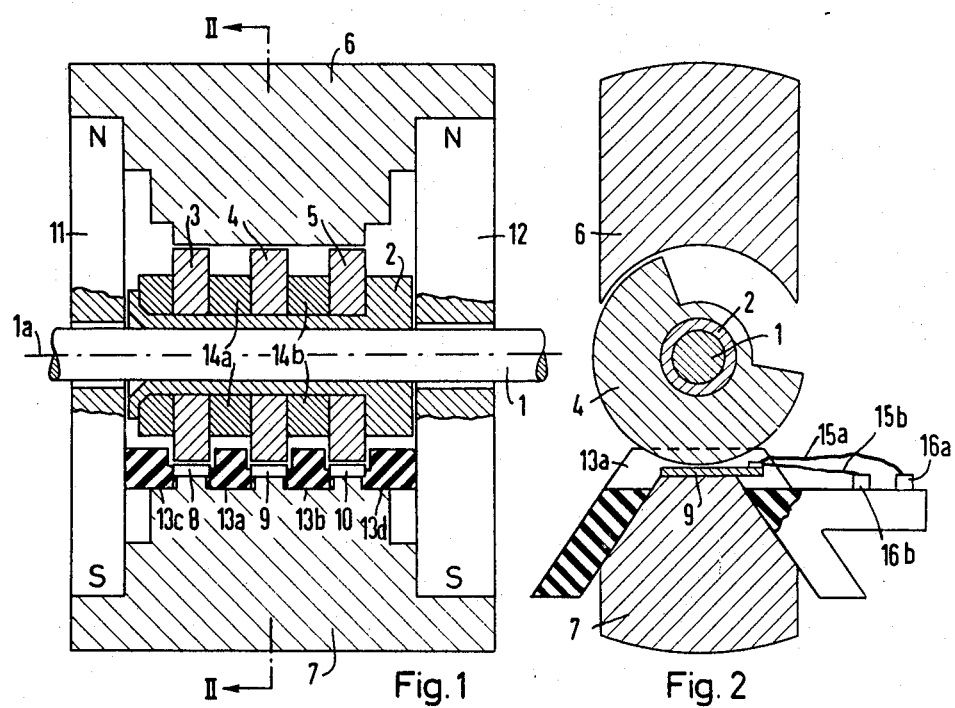
FIG. 1 is a side view, partly in section, of an embodiment of the noncontact electrical coupling device of the present invention.
FIG. 2 is a cross-sectional view, taken along the lines II—II of FIG. 1.
Figure 3:
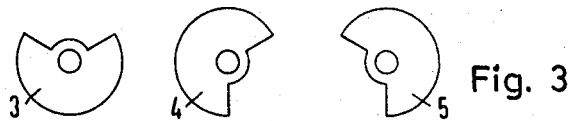
FIG. 3 is a schematic presentation of the positioning of the switch members relative to each other.

The noncontact electrical coupling device of FIG. 1 comprises a switch shaft 2 which is coaxially positioned around the shaft 1 of the electrical machine with which said device is utilized. The shaft 1 has an axis 1a and the switch shaft 2 is of substantially sleeve-like or tube-like configuration. Switch members 3, 4 and 5 are positioned on the switch shaft 2 in equally spaced relation to each other. Each of the switch members 3, 4 and 5 is of substantially disc-like configuration positioned coaxially with the axis 1a and extending perpendicularly to said axis.

Each of the switch members 3, 4 and 5 rotates with the switch shaft 2 and the shaft 1 around the axis 1a. The switch members 3, 4 and 5 are each of substantially disc-like configuration with a circular sector cutout of from 120 to 140°. The switch members 3, 4 and 5 are each of soft magnetic material of identical configuration and are preferably positioned at 120° in angular relation to each other. Thus, the radial angular bisection line of the cutout sector of each of the switch members 3, 4 and 5 is preferably angularly spaced 120° from the radial angular bisection line of the cutout section of each of the others of said switch members.

The switch shaft 2 and the switch members 3, 4 and 5 are positioned between spaced pole shoes 6 and 7 which are permanently magnetically excited or energized by permanent magnets 11 and 12 which are positioned between the pole shoes 6 and 7 and around the shaft 1 in coaxial relation with said pole shoes and said shaft but spaced from said shaft. The switch members 3, 4 and 5 are separated from each other by soft magnetic washers or spacers 14a and 14b positioned in the spaces between the switch members 3 and 4, and 4 and 5, respectively.

A field plate 8 is positioned in radial alignment with the switch member 3 and is affixed to the pole shoe 7. A field plate 9 is positioned in radial alignment with the switch member 4 and is affixed to the pole shoe 7. A field plate 10 is affixed to the pole shoe 7 and positioned in radial alignment with the switch member 5. The field plates 8, 9 and 10 are equally spaced from each other and are separated by magnetic shielding members 13a and 13b positioned between the field plates 8 and 9, and 9 and 10, respectively. Magnetic shielding members 13c and 13d are positioned on the other side of the field plate 8 from the member 13a and on the other side of the field plate 10 from the member 13b.

When the shaft 1 rotates, the switch members 3, 4 and 5 rotate with said shaft and provide strong magnetic fields at each of the field plates 8, 9 and 10 in sequence, in accordance with the angular relation of said switch members. The magnetic shielding members 13a and 13b prevent the magnetic field provided by a switch member 3, 4 or 5 from affecting either of the field plates other than the field plate 8, 9 or 10 in alignment with such switch member.

When the switch member 4 is in its position shown in FIG. 2, it provides a strong or intense magnetic field for the field plate 9. When the field plate 9 is subjected to a strong magnetic field in a narrow air gap, the electrical electrical resistance of said field plate has a maximum magnitude. As shown in FIG. 2, each of the field plates 8, 9 and 10 may be connected into a circuit via terminals and terminal leads such as the terminals 16a and 16b and the terminals leads 15a and 15b of the field plate 9.

The sharpness, steepness or magnitude of the switching pulses provided by the electrical coupling device of the present invention may be varied by variation of the air gap and the pole shoes. Each of the switch members 3, 4 and 5 provides stray magnetic fields at its edges adjacent the sector cutout thereof. The stray magnetic fields, in passing across the field plates, prevents sharp changes in the switching or coupling characteristic, thereby maintaining a stable sharpness or steepness of the switching characteristic. The switching pulses or signals of the electrical coupling device of the present invention are thus substantially devoid of harmonic vibration, sparks or radio interference.

Figure 4:
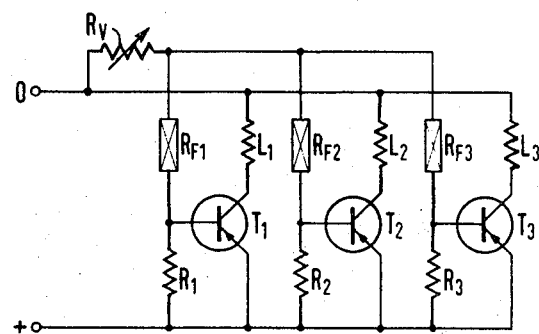
FIG. 4 is a circuit diagram utilizing the noncontact electrical coupling device of the present invention.

FIG. 4 discloses a circuit which utilizes the electrical coupling devices of the present invention. In FIG. 4, the three field plate $R_{F1}$, $R_{F2}$ and $R_{F3}$ are connected to the collector circuits of transistors $T_1$, $T_2$ and $T_3$, respectively. The transistors $T_1$, $T_2$ and $T_3$ are operated in grounded base configuration with each field plate connected at one end to the base electrode of the corresponding transistor and at its other end to the collector electrode of the corresponding transistor via a variable resistor $R_V$ and the corresponding one of load resistors $L_1$, $L_2$ and $L_3$. The collector-base output voltage of each of the transistors $T_1$, $T_2$ and $T_3$ is provided at its load resistor $L_1$, $L_2$ and $L_3$, respectively.

A constant resistance resistor $R_1$, $R_2$ and $R_3$, respectively, is connected in the emitter circuit of each of the transistors $T_1$, $T_2$ and $T_3$ between the emitter and base electrodes thereof. Instead of the resistors $R_1$, $R_2$ and $R_3$, thermistors are preferably utilized in order to eliminate temperature-responsive variations in the circuit. The field plates, which comprise galvanomagnetic resistors, and the load resistors have electrical resistances which vary in the same direction in accordance with temperature variations, and which vary in the same direction as a thermistor. Thus, to provide temperature stability or independence of the circuit, the resistors $R_1$, $R_2$ and $R_3$ should be thermistors and the thermistors should be such that their electrical resistance variation with temperature corresponds to the combined electrical resistance variation with temperature of the field plates $R_{F1}$, $R_{F2}$ and $R_{F3}$ and the load resistors $L_1$, $L_2$ and $L_3$.

The variable resistor $R_V$ is connected in common in series with each of the field plates $R_{F1}$, $R_{F2}$ and $R_{F3}$ and permits adjustment of the electrical coupling device of the present invention such as, for example, for tolerances of its components, as well as adjustment of the switching ratio $R_B/R_0$ of the field plates and thereby the effectiveness of the electrical coupling device of the present invention which is thus improved or made an optimum for the operating conditions.

Figure 5:
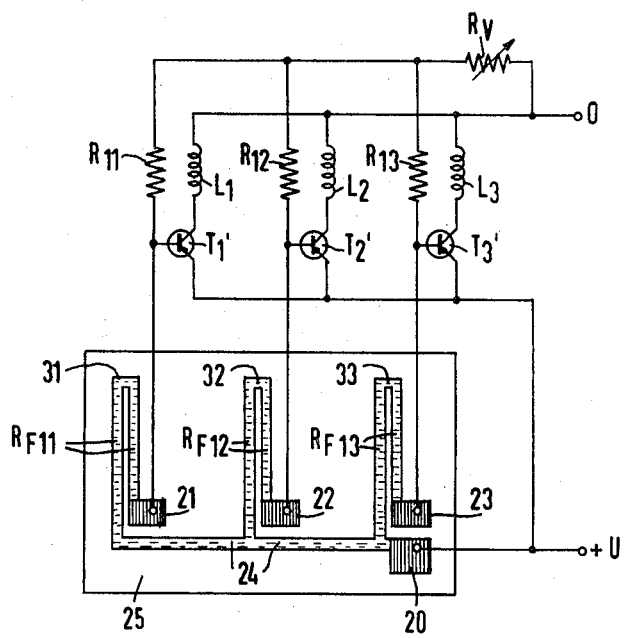
FIG. 5 is a combined circuit diagram and schematic diagram of an embodiment of the noncontact electrical coupling device of the present invention having four electrical contacts.

Instead of the separate field plates 8, 9 and 10, a single field plate may be utilized. A single field plate is shown in FIG. 5. The field plate of FIG. 5 comprises three galvanomagnetic portions $R_{F11}$, $R_{F12}$ and $R_{F13}$ and four electrical contacts 20, 21, 22 and 23. The field plate is of substantially comb-like or E-shaped structure with the contact 20 at one side of the stem portion and the contacts 21, 22 and 23 on the other side of the stem portion at each of the branches. The galvanomagnetic portions $R_{F11}$, $R_{F12}$ and $R_{F13}$ are thus connected in parallel relative to a source of electrical voltage U and the contact 20 is common to all of said portions. The galvanomagnetic portions $R_{F11}$, $R_{F12}$ and $R_{F13}$ constitute the branches of the structure. The galvanomagnetic portions $R_{F11}$, $R_{F12}$ and $R_{F13}$ are equally spaced from each other by a distance determined by the axial thickness of the switch members 3, 4 and 5 (FIG. 1).

The single field plate of FIG. 5 is advantageous over the separate field plates of FIG. 1 because it utilizes only four contacts whereas the separate field plates utilize six contacts, and because it is maintained at the same temperature by being mounted on a support plate 25 whereas the separate field plates are not maintained at the same temperature in so simple a manner. The single field plate is made with greater simplicity and facility than three separate field plates, because the same results are attained with one semiconductor plate as with three times the single component.

The field plate of FIG. 5, as well as the field plates of FIG. 1, comprise heavily galvanomagnetic material such as, for example, $A^{III}B^V$ compounds, such as indium antimonide or indium arsenide from Groups III and V of the Periodic Table. A particularly strong response to the magnetic field is attained by a field plate semiconductor material which includes semiconducting and good conducting segments substantially oriented in one or two dimension and substantially parallel to each other, such as, for example, nickel antimonide needles in indium antimonide. Suitable electrically anisotropic semiconductor bodies of this type are described in United States Patent No. 3,226,225.

Electrically anisotropic semiconductor material is particularly well suited for the field plate of FIG. 5, which is produced from a semiconductor plate in such a manner that the segments or inclusions in the semiconductor strip 24, which is the stem portion of the structure, are oriented or aligned in parallel with the direction of current flow. The segments or inclusions in the branches of the structure are oriented or aligned perpendicularly to the direction of current flow through the semiconductor material, except at the loop ends 31, 32 and 33. The single field plate may be made by affixing or cementing a thin semiconductor plate having the appropriately oriented inclusions or segments to the support plate 25. The support plate 25 is then ground and polished to a thickness of 5 to 25 microns and may be etched in the desired pattern of the semiconductor.

The galvanomagnetic portions $R_{F11}$, $R_{F12}$ and $R_{F13}$ of the field plate of FIG. 5 are on one side of the stem portion 24, but do not adversely affect the operation of the device if the semiconductor material has properly oriented, good conducting inclusions or segments. The strip 24 may be readily shielded from the varying magnetic field utilized to control the operation of the device. The conductivity of the strip 24, in which the segments or inclusions are aligned in parallel with the direction of current flow, is considerably greater than that of a strip in which the segments or inclusions are aligned perpendicularly to the direction of current flow. The conductivity may be three times greater.

The basic resistance value of a field plate determines whether it is connected into the base-collector circuit or the base-emitter circuit of the transistor. The galvanomagnetic portions $R_{F11}$, $R_{F12}$ and $R_{F13}$ of the field plate of FIG. 5 are thus connected in the base-emitter circuits of the transistors $T_1'$, $T_2'$ and $T_3'$. Resistors $R_{11}$, $R_{12}$ and $R_{13}$ are connected in the base-collector circuits of the transistors $T_1'$, $T_2'$ and $T_3'$, respectively, of FIG. 5 and preferably comprise thermistors.

While the invention has been described by means of specific examples and in specific embodiments, I do not wish to be limited thereto, for obvious modifications will occur to those skilled in the art without departing from the spirit and scope of the invention.

I claim:
1. A contact-free electrical coupling device, comprising
   a magnetic circuit having stationary parts and a rotatable part positioned between and spaced from said stationary parts and forming an air gap around said rotatable part, said rotatable part having an axis;
   a plurality of spaced switch members of substantially disc-like configuration coaxially affixed on said rotatable part and rotatable with said rotatable part about said axis, each of said switch members having a circular sector cutout therefrom in a manner whereby magnetic flux of said magnetic circuit is maintained in any rotary position of said switch member, the circular sector cutouts of the switch members being angularly positioned in a determined relation to each other in a manner whereby the entire magnetic flux of said magnetic circuit is concentrated by one of said switch members; and
   a plurality of spaced galvanomagnetic semiconductor field plates each positioned in radial alignment with a corresponding one of said switch members, said field plates being mounted on one of said stationary parts in spaced relation with said switch members.

2. A contact-free electrical coupling device as claimed in claim 1, wherein said switch members are equally spaced from each other and are perpendicular to said axis and said field plates are equally spaced from each other.

3. A contact-free electrical coupling device as claimed in claim 1, wherein each of said switch members comprises soft magnetic material.

4. A contact-free electrical coupling device as claimed in claim 1, wherein each of the circular sector cutouts of said switch members is angularly positioned at substantially 120° in relation to the others.

5. A contact-free electrical coupling device as claimed in claim 1, wherein each of the circular sector cutouts of said switch members is angularly positioned at 120 to 140° relative to the others whereby said switch members provide a magnetic field to said field plates in sequence.

6. A contact-free electrical coupling device as claimed in claim 1, wherein said galvanomagnetic semiconductor field plates form an integral unit of determined structure, said device comprising a support plate and said integral unit being mounted on said support plate.

7. A contact-free electrical coupling device as claimed in claim 1, wherein said switch members are equally spaced from each other and are perpendicular to said axis and each of the circular sector cutouts of said switch members is angularly positioned at 120 to 140° relative to the others whereby said switch members provide a magnetic field to said field plates in sequence, and said field plates are equally spaced from each other.

8. A contact-free electrical coupling device, comprising
   a magnetic circuit having stationary parts and a rotatable part positioned between and spaced from said stationary parts and forming an air gap around said rotatable part, said rotatable part having an axis;
   a plurality of spaced switch members of substantially disc-like configuration coaxially affixed on said rotatable part and rotatable with said rotatable part about said axis, each of said switch members having a circular sector cutout therefrom, the circular sector cutouts of the switch members being angularly positioned in a determined relation to each other;
   a support plate; and
   a plurality of spaced galvanomagnetic semiconductor field plates each positioned in radial alignment with a corresponding one of said switch members, said field plates being mounted on one of said stationary parts in spaced relation with said switch members, said galvanomagnetic semiconductor field plates forming an integral unit of determined structure mounted on said support plate, said integral unit being of substantially E-shaped configuration having a stem portion and a plurality of branch portions extending transversely from said stem portion.

9. A contact-free electrical coupling device as claimed in claim 8, wherein each of said branch portions comprises a galvanomagnetic semiconductor field plate extending from said stem portion to an end spaced from said stem portion.

10. A contact-free electrical coupling device as claimed in claim 9, wherein said device further comprises a plurality of electrical contacts, one of which electrical contacts being connected to said stem portion on one side of said branch portions and each of the others of which electrical contacts being connected to the end of a corresponding one of said branch portions.

References Cited

UNITED STATES PATENTS

| | | | |
|---|---|---|---|
| 2,924,633 | 2/1960 | Sichling et al. | 123—148 |
| 3,170,323 | 2/1965 | Kuhrt et al. | 73—136 |
| 3,309,642 | 3/1967 | Gfancoin | 338—32 |

DAVID X. SLINEY, Primary Examiner

U.S. Cl. X.R.

310—219; 338—32; 323—73